United States Patent [19]

Bausch et al.

[11] Patent Number: 5,110,281
[45] Date of Patent: May 5, 1992

[54] RUBBER INJECTION PRESS

[75] Inventors: Günther Bausch, Vaihingen-Enz; Fritz Wächter, Kirchheim/Teck-Naber, both of Fed. Rep. of Germany

[73] Assignee: Werner & Pfleiderer, GmbH, Fed. Rep. of Germany

[21] Appl. No.: 578,891

[22] Filed: Sep. 6, 1990

[30] Foreign Application Priority Data

Sep. 26, 1989 [DE] Fed. Rep. of Germany ....... 3932039

[51] Int. Cl.⁵ ............................................. B29C 33/08
[52] U.S. Cl. ..................................... 425/406; 249/78; 249/80; 425/408; 425/547
[58] Field of Search ................ 425/193, 195, 547, 548, 425/408; 100/908, 918; 249/78, 80; 164/98

[56] References Cited

U.S. PATENT DOCUMENTS

| 1,218,465 | 3/1917 | Reichold | 164/98 |
|---|---|---|---|
| 2,579,898 | 12/1951 | Brucker | 249/78 |
| 2,907,070 | 10/1959 | Hartesveldt | 249/80 |
| 3,139,676 | 7/1964 | Grover | 100/918 |
| 3,233,292 | 2/1966 | Kramer et al. | 249/78 |
| 3,638,473 | 2/1972 | McElroy | 100/918 |
| 3,819,312 | 6/1974 | Arpajian | 425/547 |
| 4,206,699 | 6/1980 | Hemmelgarn | 100/918 |
| 4,258,620 | 3/1981 | Sallander | 100/918 |
| 4,285,385 | 8/1981 | Hayashi et al. | 164/98 |
| 4,553,795 | 11/1985 | Takagi | 100/918 |
| 4,743,192 | 5/1988 | Higuchi | 425/195 |
| 4,834,558 | 5/1989 | Morse | 100/918 |
| 4,842,506 | 6/1989 | Coutier | 425/193 |

FOREIGN PATENT DOCUMENTS

| 1177935 | 9/1964 | Fed. Rep. of Germany | 100/918 |
|---|---|---|---|
| 2527181 | 12/1976 | Fed. Rep. of Germany | |
| 3533768 | 4/1987 | Fed. Rep. of Germany | 100/918 |
| 3078720 | 4/1988 | Japan | 249/78 |
| 4672 | of 1909 | United Kingdom | |

OTHER PUBLICATIONS

Werner & Pfleiderer Gummitechnik; Anlagen und Systeme zur Aufbereitung und Verarbeitung; VF04 044/1-3.0+3.0-VIII.80GM; Printed in Federal Republic of Germany.

Primary Examiner—Richard L. Chiesa
Attorney, Agent, or Firm—Laff, Whitesel, Conte & Saret

[57] ABSTRACT

A rubber injection press with a stationary clamping table with a mould element and with a carriage with a further mould element, which carriage is movable in a direction towards the clamping table to close a mould formed by the two mould elements, has a heater associated at least with the stationary mould element and provided in the form of a heating panel, which is arranged between it and the clamping table and in which heating elements are arranged. So as to achieve a good heat transfer from the heating elements to the heating panel with, at the same time, the breakdown frequency being reduced and there being a wide range of design possibilities regarding the arrangement of the heating elements, the latter are cast in the heating panel as heating coils. Thus it is possible also to arrange rapid clamping devices in the heating panel.

19 Claims, 3 Drawing Sheets

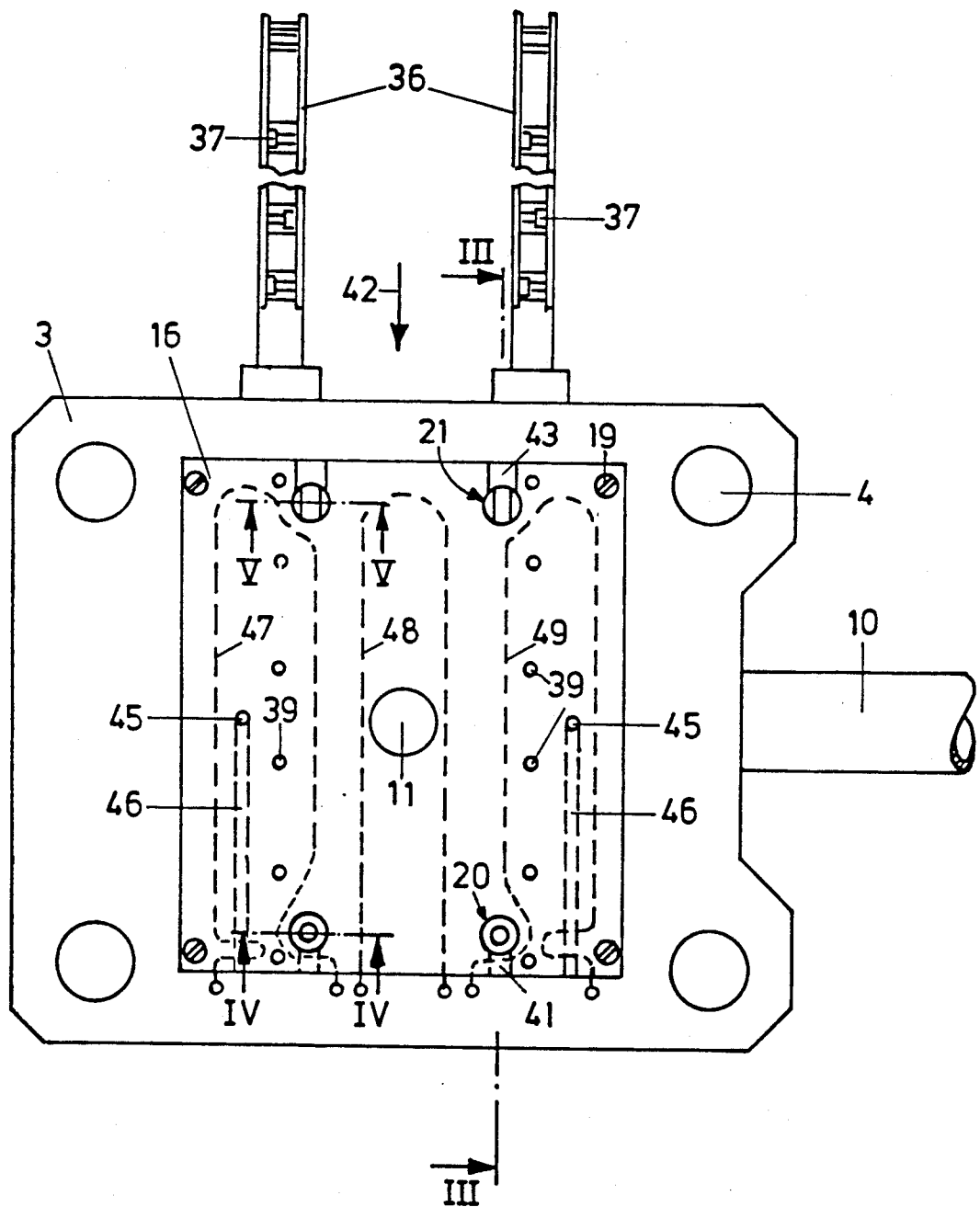

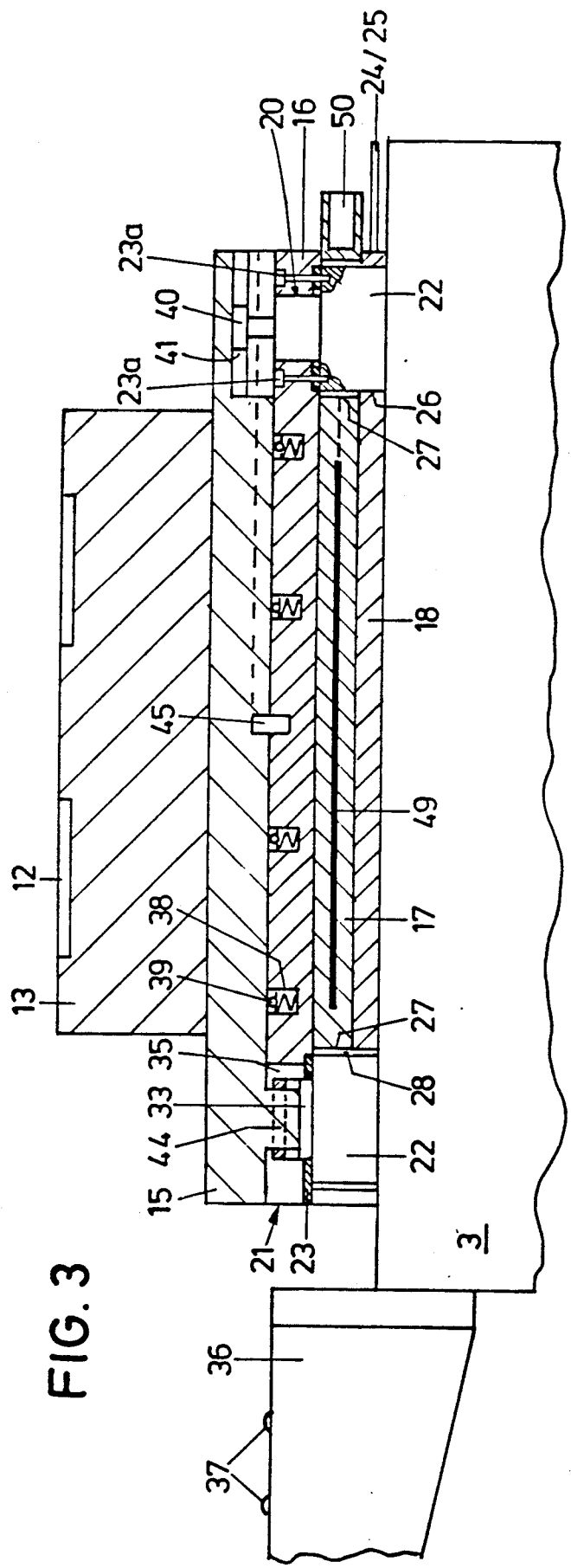

RUBBER INJECTION PRESS

FIELD OF THE INVENTION

The invention relates to a rubber injection press with a stationary clamping table, bearing a mould element and with a carriage with another mould element, which is movable in a direction towards the clamping table to close a mould formed by the two mould elements, with a heating in the form of a heating panel arranged between the mould element borne by the clamping table and the clamping table, in which heating panel heating elements are arranged.

BACKGROUND OF THE INVENTION

Such a rubber injection press is commercially available in horizontal and vertical design and is for example known from the firm leaflet "WERNER & PFLEIDERER Gummitechnik" VF 04 044/1-3.0+3.0-VIII.80 GM. In this press rubber is plasticized in a plasticization unit after the joining and closing of the mould and is injected into the mould pockets by means of an injection unit and through corresponding injection channels or injection nozzles, respectively, in the clamping table, through the heating panel and the corresponding stationary mould elements. Then both mould elements are heated by means of a corresponding heating panel, so that the vulcanizing process can take place. The heating elements in the heating panel are in the form of so-called heating cartridges, which are inserted into corresponding bores of the heating panel. It is of disadvantage that the heat transfer between the heating cartridge and the heating panel is comparatively bad. Further, there is a considerable risk of collision between the straight-lined heating cartridges and other parts possibly necessary in terms of design, such as clamping elements, whereby the possible design regarding the arrangement of the heating cartridges is further restricted. A non-uniform heat transfer from the respective heating cartridge to the heating panel is further caused by dimensional tolerances, which may in turn result in local overheatings and thus also in a breakdown of the heating cartridges.

A press plate for a vulcanizing press is known from German published patent application 25 27 181. This press plate consists of a heating panel formed as an extrusion component and provided with bracing webs extending parallel to one another. A cover plate is put onto these bracing webs. These components consist of light metal. Any optional heating elements in the form of panel heaters, heating tubes, heating foils or the like are inserted in the hollow space between neighbouring bracing webs. It is rather doubtful whether the heat transfer to the press plate is satisfactory.

A heating plate is known from British patent 4672 of 1909 comprising a plate provided to emit heat, a so-called hot plate, and an insulated plate. A heating in the form of a spiral is arranged in a hollow space between the two plates and is to heat the so-called hot plate inductively and by radiation. The disadvantages outlined above apply to this design, too.

SUMMARY OF THE INVENTION

It is the object of the invention to embody a rubber injection press in such a way that a good heat transfer from the heating elements to the heating plate is achieved with, at the same time, the breakdown frequency being reduced and there being a wide range of design possibilities regarding the arrangement of the heating elements.

This object is attained in accordance with the invention by the heating elements being flexible heating coils which are cast in the heating panel. The use of flexible heating coils according to the invention permits to place them in accordance with constructive requirements, i.e. they can in particular be guided around areas to be kept free, while at the same time a heating coil may in turn be provided between two such areas to be kept free. Further, a good heat transfer is achieved by these heating coils being cast in the heating panel, since direct full-surface metal contact between the heating panel and the heating coil is provided. Thus local overheatings are excluded. The heating panel may favorably consist of aluminum or an aluminum alloy, while also other materials of sufficient heat conductivity and pressure resistance may be used to transmit the closing pressure of the mould via the heating panel, i.e. by means of the heating panel.

The advantages inherent in the measures according to the invention take effect in particular where clamping elements are provided as rapid clamping devices and integrated in the heating panel to connect a mould element or a support plate bearing the mould element with the clamping table or a clamping plate arranged on it. In this case the heating coils can be guided around the rapid clamping device at a sufficient distance, so that the thermal stress of the rapid clamping devices is limited. On the other hand, the areas of the heating panel between two adjacent recesses for rapid clamping devices may in turn be provided with heating coils and consequently be heated. In this case and when the demoulding of the injection mouldings occurs automatically, the heating panel may in a simple manner be made horizontally slidable on the clamping table.

The embodiment, wherein the first mould element is connected with a clamping plate by means of rapid clamping devices, which clamping plate is connected with the heating panel, has the further advantage that the unit consisting of mould element, clamping plate, heating panel and possibly insulation board together with the rapid clamping devices integrated in the heating panel and the insulating board may be designed laterally slidable, i.e. at right angles to the closing direction of the mould, for demoulding, i.e. for demoulding injection mouldings. To this effect this unit would be guided like a drawer on the clamping table.

Further advantages and features of the invention will become apparent from the ensuing description of an exemplary embodiment, taken in conjunction with the drawing.

BRIEF DESCRIPTION OF THE DRAWING

FIG. 2 is a view on the clamping table of the press according to FIG. 1 without a mould element, FIG. 3 is a cross-section through the clamping table with a mould element along the line III—III in FIG. 2, FIG. 4 is a part cross-section through FIG. 2 along the line IV—IV in FIG. 2 with a rapid clamping device, and FIG. 5 is a further part cross-section through FIG. 2 along the line V—V in FIG. 2 with another rapid clamping device.

DESCRIPTION OF THE PREFERRED EMBODIMENT

Figure 1:
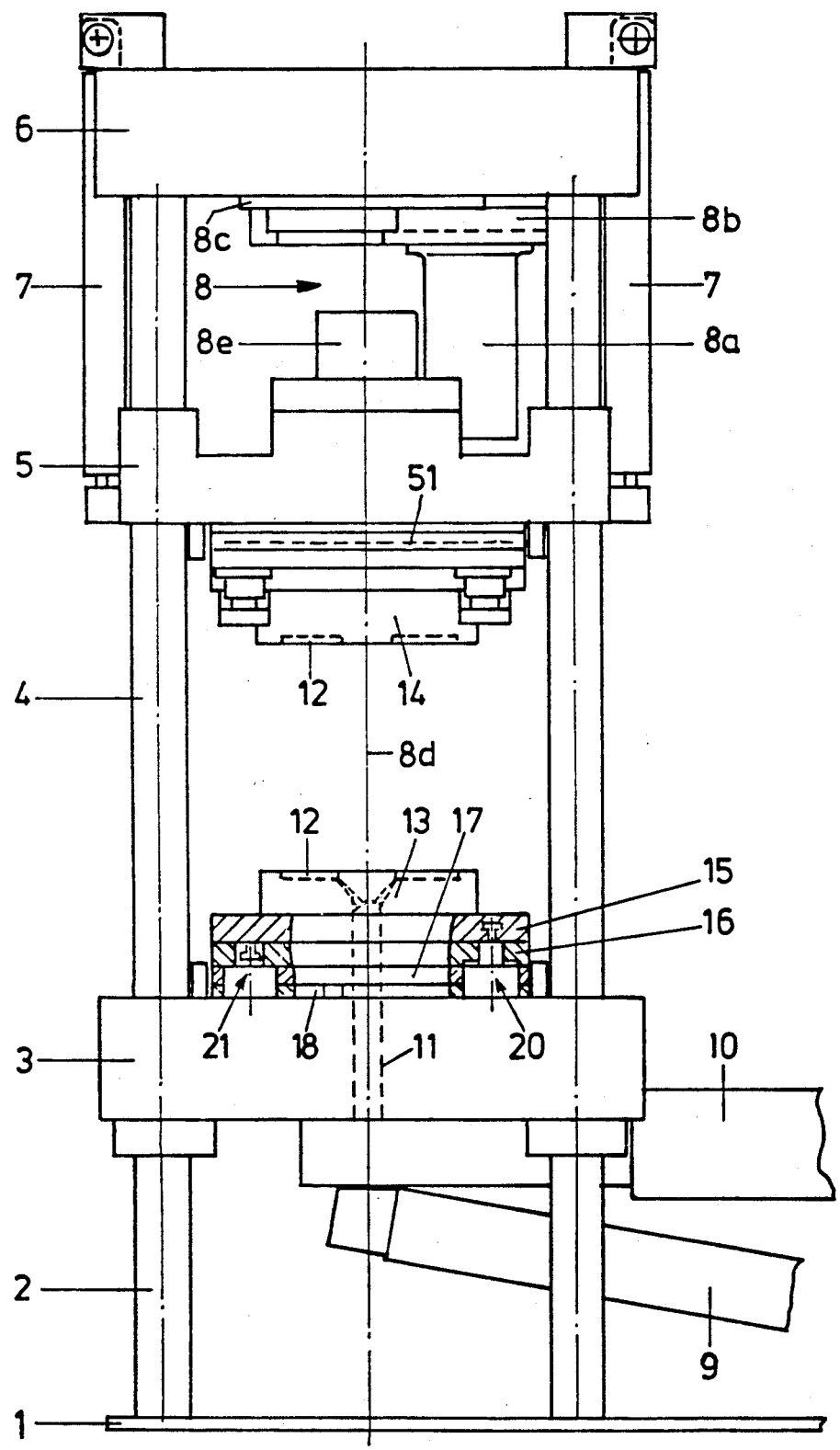
FIG. 1 is a side view of a rubber injection press in a schematic representation broken up in part.

FIG. 1 shows a known rubber injection press—with the exception of some details explained below—in a schematic representation. On a foundation plate 1 four stand columns 2 are arranged in rectangular arrangement supporting a lower clamping table 3. Four guide columns 4, which are in alignment and, as the case may be, form one piece with the stand columns 2, extend upwards from the clamping table 3 and an upper carriage 5 is vertically slidably guided on them. The four guide columns 4 are connected with each other by means of an upper crosshead 6. A closing drive 7, by which the carriage 5 can be transported downwards and then again upwards, is supported opposite the crosshead and is formed by several hydraulically actuated piston-cylinder units. Further, a locking device 8, by means of which the carriage 5 may be locked in a lower position, is supported opposite the crosshead 6. It has a locking block 8a slidable in a guideway 8b at right angles to the sliding direction of the carriage 5. This guideway is connected with a locking drive 8c in the form of a hydraulically actuated piston-cylinder unit. When the carriage 5 is moved towards the clamping table 3, the locking block 8a can be brought into a position in alignment with the central longitudinal axis 8d of the press, in which position it can then be moved to bear against an abutment 8e on the carriage 5 by means of the short-stroke locking drive 8c, thus locking the carriage 5 in its lower position.

A plasticization unit 9 is arranged at the side of and below the clamping table 3, in which unit rubber is plasticized by means of a plasticization worm and a corresponding heating and is conveyed to the head of an injection unit 10. The plasticized rubber is injected by means of this injection unit 10 through an injection channel 11 into mould pockets 12 of a mould of a shape corresponding to the rubber part to be produced. This mould comprises a lower mould element 13 and an upper mould element 14, which are moved towards one another by means of the described movement of the carriage 5, thus closing the mould. It is then locked by means of the locking device 8. The upper mould element 14 is in usual manner secured to the lower side of the carriage 5. The lower mould element 13 is secured to a mould-element bearing plate 15. The mould element 13 and the mould-element bearing plate 15 may of course be formed in one piece. The mould-element bearing plate 15 is in turn fixed on a clamping plate 16 provided on a heating panel 17. The latter in turn bears on the clamping table 3 by way of a heat insulating plate 18. The clamping plate 16, the bearing plate 15 and the lower mould element bear one against the other over their full surface and consist of metal, so that a good heat insulation is ensured from the heating plate 17 to the mould pockets 12. As can be seen from FIG. 2, the package consisting of the clamping plate 16, the heating panel 17 and the insulating plate 18 is secured to the clamping table 3 by means of screws 19. When the package consisting of the mould element 13, the mould-element bearing plate 15, the clamping plate 16, the heating panel 17 and the insulating plate 18 is to be embodied laterally slidable on the clamping table 3 for the demoulding of injection mouldings, i.e. of moulded parts, then these screws 19 are not provided; then only the clamping plate 16, the heating panel 17 and the insulating plate 18 are connected with each other for example also by means of screws. Such a laterally slidable design is not shown; it may be achieved by corresponding lateral slide-ways.

Rapid clamping devices 20, 21 are arranged on the clamping table 3 in rectangular arrangement in the form of hydraulically actuated piston-cylinder units. Their cylinders 22 are insulated and supported against the clamping plate 16 by means of a very firm insulation 23 of special supporting capacity and are secured to the clamping plate 16 from above by means of screws 23a. The hydraulic lines 24, 25 for the pressure fluid to be supplied or discharged are introduced from the side. The cylinders 22 of the clamping devices 20, 21 pass through corresponding recesses 26 in the insulating plate 18 and recesses 27 in the heating panel 17, the recesses 27 in the heating panel being dimensioned such that a gap 28 is formed between the respective cylinder 22 and the heating panel 17, which gap is either filled with air or some other heat insulating material.

The clamping devices 20, 21 have—as shown in FIG. 4—a piston 29 slidably guided in the cylinder 22 and separating the inner chamber of the respective cylinder 22 into two piston chambers 30, 31, the hydraulic line 24 running into the one piston chamber 30 and the hydraulic line 25 running into the other piston chamber 31. An upwards projecting piston rod 32 and 33, respectively, is secured to the piston 29. This piston rod passes through a corresponding recess 34 and 35, respectively, in the clamping plate 16.

On one side of the clamping table 3 two supply webs 36 are provided for the mould-element bearing plate 15 connected with the lower mould element 13. These supply webs 36 are provided with rollers 37 and run at approximately the same level as the upper side of the clamping plate 16. The latter is in turn—as can be seen from FIGS. 2 and 3—provided with rollers 39 supported by way of springs 38 in the respective prolongation of the supply webs 36, so that lying on these rollers 39 the bearing plate 15 can be slid over the clamping plate 16. Upon subsequent bracing of the bearing plate 15 against the clamping plate 16, the rollers 39 give way to the force of the pre-stressed springs 38 into the clamping plate 16.

At the side opposite the supply webs 36 the two rapid clamping devices 20 have clamping journals 40 T-shaped in cross-section and engaging with grooves 41 correspondingly relieved by cutting in the mould-element bearing plate 15, when the latter is slid from the supply webs 36 onto the clamping plate 16 in slide-on direction 42.

The piston rod 33 of the clamping device 21 has a receiving groove 43 which—as can be seen from FIG. 5—corresponds in cross-section to a T turned upside down. Associated with it a clamping journal 44 is in each case secured to the lower side of the bearing plate 15 and is adjusted in cross-section, namely having the shape of a T turned upside down. The recess 35, in which the piston rod 33 is situated, is open in a direction towards the supply web 36, i.e. in each case in the slide-on direction 42. Due to this design it is achieved that the bearing plate 15 being slid on and over the clamping plate the groove 41 is slid over the clamping journals 40, while the clamping journals 44 first enter into the respective recess 35 and are then introduced into the receiving groove 43. At the same time a centring of the bearing plate 15 is effected by means of two centering pins 45 engaging with associated centring grooves 46 when the bearing plate 15 is slid on, which grooves are in turn provided on the lower side of the bearing plate 15 running in slide-on direction 42. After the bearing plate 15 has been slid on the upper piston chambers 30 of the cylinders 22 are actuated with pressure fluid via the associated hydraulic line 24, while the lower piston chamber 31 is relieved by opening the hydraulic line 25. Thus the piston rods 32, 33 are drawn downwards, i.e. the clamping journal 40 of the two rapid clamping devices 20 clamps the bearing plate 15 against the clamping plate 16. Moreover, the piston rod 33 draws the clamping journal 44 downwards, which equally serves to clamp the bearing plate 15 on the clamping plate 16. The removal and dismounting of the bearing plate 15 with the lower mould element takes place in reverse order.

The heating panel 17 is cast in one piece, the heating elements 47, 48, 49 being equally cast in the form of elastic heating coils. These heating elements 47, 48, 49 run into a heating-element connection 50 outside. The heating coils are commonly available electric heating elements consisting of an inner heating wire and an outer tube and being cast in the heating panel 17, so that a good heat transfer is ensured from the heating elements 47, 48, 49 to the heating plate 17. As indicated in FIG. 2, they can be guided around the recesses 27 for the cylinders 22 of the rapid clamping devices 20, 21 in such a way that they are sufficiently distant from them and do not heat them too strongly. The clamping devices 20, 21 need no longer be arranged outside the clamping plate and the heating panel, as it has so far been necessary to ensure uniform heating. Further, the heating elements 47, 48, 49 can be guided such that as uniform as possible a heating of the heating panel 17 is realized, namely that an approximately constant heat supply is achieved per unit of area of the heating panel 17. Above all this the heating elements 47, 48, 49 can be guided such that no collisions due to construction result with other parts, such as for example the injection channel 11. Thus there is a comparatively wide range of design regarding the guidance of the heating elements.

A heating panel 51 is also provided between the carrage 5 and the upper mould element 14 and may be provided with heating coils as heating elements.

What is claimed is:

1. A rubber injection press comprising:
    a stationary clamping plate;
    a first mould element supported by said stationary clamping plate;
    a heater in the form of a heating panel arranged between the stationary clamping plate and the first mould element;
    heating elements arranged in the heating panel;
    a carriage movable in a direction towards and away from the stationary clamping plate;
    a second mould element supported by said carriage; and
    a mould formed by said first and said second mould element, which is closed by moving said carriage towards said stationary clamping plate, and which is opened by moving said carriage away from said stationary clamping plate;
    wherein the heating elements are flexible heating coils which are cast in the heating panel,
    the heating panel consists substantially of aluminum, and wherein the first mould element is connected with another clamping plate by means of clamping devices, and said another clamping plate is connected with the heating panel.

2. A press according to claim 1, wherein the first mould element is connected with said another clamping plate by means of rapid clamping devices.

3. A press in accordance with claim 2, wherein the heating elements are formed around the rapid clamping devices.

4. A press in accordance with claim 2, wherein the rapid clamping devices are arranged in recesses of the heating panel, whereby the cross-section of the recesses is adjusted to the cross-section of the rapid clamping devices.

5. A press in accordance with claim 4, wherein the rapid clamping devices are arranged in the recesses with a clearance left free.

6. A rubber injection press according to claim 1 wherein the stationary clamping plate is a stationary clamping table and wherein the first mould element and the heating panel are arranged above said stationary clamping table.

7. A rubber injection press according to claim 1 wherein the heating elements are electric heating elements.

8. A rubber injection press comprising:
    a stationary clamping plate;
    a first mould element supported by said stationary clamping plate;
    a heater in the form of a heating panel arranged between the stationary clamping plate and the first mould element;
    heating elements arranged in the heating panel;
    a carriage movable in a direction towards and away from the stationary clamping plate;
    a second mould element supported by said carriage; and
    a mould formed by said first and said second mould element which is closed by moving said carriage towards said stationary clamping plate, and which is opened by moving said carriage away from said stationary clamping plate; wherein the heating elements are flexible heating coils which are cast in the heating panel,
    wherein the first mould element is connected with another clamping plate by means of rapid clamping devices, and said another clamping plate is connected with the heating panel; and
    wherein the rapid clamping devices are arranged in recesses of the heating panel, whereby the cross-section of the recesses are adjusted to the cross-section of the rapid clamping devices.

9. A rubber injection press according to claim 8 wherein the stationary clamping plate is a stationary clamping table and wherein the first mould element and the heating panel are arranged above said stationary clamping table.

10. A rubber injection press according to claim 8 wherein the heating elements are electric heating elements.

11. A rubber injection press comprising:
    a stationary clamping plate;
    a first mould element supported by said stationary clamping plate;
    a heater in the form of a heating panel arranged between the stationary clamping plate and the first mould element;
    heating elements arranged in the heating panel;
    a carriage movable in a direction towards and away from the stationary clamping plate;

a second mould element supported by said carriage; and a mould formed by said first and said second mould element which is closed by moving said carriage towards said stationary clamping plate, and which is opened by moving said carriage away from said stationary clamping plate;

wherein the heating elements are flexible heating coils which are cast in the heating panel wherein the first mould element is connected with another clamping plate by means of rapid clamping devices, and said another clamping plate is connected with the heating panel; and wherein the rapid clamping devices are provided as hydraulically actuated piston-cylinder units, of which cylinders are arranged in recesses of the heating panel and of which piston rods extend in a direction towards the first mould element.

12. A rubber injection press according to claim 11 wherein the stationary clamping plate is a stationary clamping table and wherein the first mould element and the heating panel are arranged above said stationary clamping table.

13. A rubber injection press according to claim 11 wherein the heating elements are electric heating elements.

14. A rubber injection press comprising:
a stationary clamping plate;
a first mould element supported by said stationary clamping plate;
a heater in the form of a heating panel arranged between the stationary clamping plate and the first mould element;
heating elements arranged in the heating panel;
a carriage movable in a direction towards and away from the stationary clamping plate;
a second mould element supported by said carriage; and
a mould formed by said first and said second mould element, which is closed by moving said carriage towards said stationary clamping plate, and which is opened by moving said carriage away from said stationary clamping plate;
wherein the heating elements are flexible heating coils which are cast in the heating panel;
wherein the first mould element is connected with another clamping plate by means of rapid clamping devices, and said another clamping plate is connected with the heating panel; and
wherein the rapid clamping devices are connected with the another clamping plate.

15. A rubber injection press according to claim 14 wherein the stationary clamping plate is a stationary clamping table and wherein the first mould element and the heating panel are arranged above said stationary clamping table.

16. A rubber injection press according to claim 14 wherein the heating elements are electric heating elements.

17. A rubber injection press comprising:
a stationary clamping plate;
a first mould element supported by said stationary clamping plate;
a heater in the form of a heating panel arranged between the stationary clamping plate and the first mould element;
heating elements arranged in the heating panel;
a carriage movable in a direction towards and away from the stationary clamping plate;
a second mould element supported by said carriage; and
a mould formed by said first and said second mould element, which is closed by moving said carriage towards said stationary clamping plate, and which is opened by moving said carriage away from said stationary clamping plate;
wherein the heating elements are flexible heating coils which are cast in the heating panel;
wherein the first mould element is connected with another clamping plate by means of rapid clamping devices, and said another clamping plate is connected with the heating panel;
and wherein the heating elements are formed around the rapid clamping devices.

18. A rubber injection press according to claim 17 wherein the stationary clamping plate is a stationary clamping table and wherein the first mould element and the heating panel are arranged above said stationary clamping table.

19. A rubber injection press according to claim 17 wherein the heating elements are electric heating elements.

* * * * *